United States Patent [19]

Hamren

[11] 3,760,527

[45] Sept. 25, 1973

[54] FLIP TYPE CASTING FLOAT

[76] Inventor: Glen C. Hamren, 3159 N. 86th St., Milwaukee, Wis. 53222

[22] Filed: Mar. 2, 1972

[21] Appl. No.: 231,150

[52] U.S. Cl. .............................. 43/44.88, 43/44.91
[51] Int. Cl. .......................................... A01k 93/00
[58] Field of Search ...................... 43/44.88, 44.91, 43/43.1, 43.15

[56] References Cited
UNITED STATES PATENTS
3,667,149  6/1972  Daigle .............................. 43/43.15
2,609,634  9/1952  Simpson ............................. 43/44.88

FOREIGN PATENTS OR APPLICATIONS
622,468  12/1962  Belgium ............................ 43/43.15

Primary Examiner—Russell R. Kinsey
Assistant Examiner—Daniel J. Leach
Attorney—Ronald E. Barry

[57] ABSTRACT

A fishing float having a buoyant body with a line guide for a fishing line passing through the body and a weighted line locking assembly mounted on one side of said body. The weight of a sinker and bait on the fishing line counterbalance the weight of the locking assembly when the float hits the water and the weight of the locking assembly flips the body over when the sinker and bait rest on the bottom of the lake, the locking assembly shifting to a locking position and locking the line from movement in the line guide when the bait and sinker are raised off the bottom of the lake.

11 Claims, 6 Drawing Figures

PATENTED SEP 25 1973 3,760,527

3,760,527

FLIP TYPE CASTING FLOAT

RELATED DISCLOSURE

This application is based on a disclosure document U.S. Pat. No. 003311 filed in the United States Patent Office on Oct. 27, 1970.

BACKGROUND OF THE INVENTION

Fishing floats are generally fixed to the fishing line at a predetermined distance from the sinker and bait. When the line is cast or thrown over the water, the entire length of line from the float to the bait must be controlled by the fisherman. The ability to fish at considerable depth is limited by the ability of the fisherman to cast the entire length of line. When casting in areas having a large amount of weeds, it is virtually impossible to cast any distance without the line becoming entangled in the weeds. When the line is reeled in, the hook is pulled through the water at the casting depth and will also become entangled in any weeds located at the bottom of the lake.

Attempts have been made to provide sliding floats on the fishing line which are cast with the bait and sinker and allow the bait and sinker to drop to predetermined depths when the float hits the water. Most of these floats must be preset and adjusted each time the fishing depth is changed. Efforts to provide for automatic adjustment of the depth of the sinker and bait have resulted in the use of complicated lock mechanisms for setting the depth of the sinker and bait.

SUMMARY OF THE INVENTION

The fishing float of the present invention is a float of the type which can be cast with the sinker and bait adjacent to the float and automatically drops the sinker and bait to the bottom of the lake. The fisherman can quickly and easily adjust the depth of the sinker and bait by merely reeling in the length line required to raise the sinker and bait the desired distance from the bottom of the lake. The float will automatically lock on the line after the desired amount of line has been reeled in and the tension on the line released. The depth of the sinker and bait can be changed without recasting by merely reeling in additional line.

DRAWINGS

FIG. 5 is a view of the fishing float showing the position of the lock assembly when the line is being reeled in; and FIG. 6 is a view of the fishing float showing the locking assembly in the lock position.

DESCRIPTION OF THE INVENTION

Figure 1:
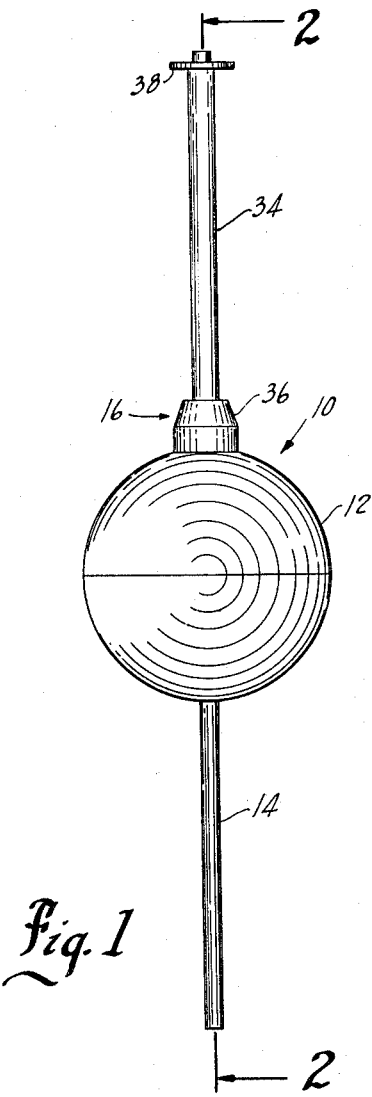
FIG. 1 is a side view in elevation of the fishing float of the present invention.

The fishing float 10 of the present invention generally includes a buoyant float or body 12, a line guide 14 and a weighted locking assembly 16. A fishing line 18 is shown passing through the line guide 14 and locking assembly 16 with a sinker 20 and a hook 22 secured to the end of the line. The float 10 is cast with the sinker 20 and hook 22 pulled against the end of the line guide 14.

When the float 10, sinker 20 and hook 22 are cast and strike the water, the sinker 20 and hook 22 with bait attached will drop to the bottom of the lake. The weight of the sinker 20 and hook 22 will counterbalance the weight of the locking assembly 16 holding the line guide 14 in a generally vertical position. The sinker and hook will pull the line through the locking assembly 16 and line guide 14 until the sinker rests on the bottom of the lake. The weight of the locking assembly 16 will then turn or flip the float 10 over, allowing the locking assembly 16 to shift to a locking position. When the line 18 is reeled into raise the sinker 20 and hook 22 off the bottom of the lake to the desired length and the tension in the line released, the weight of the sinker 20 and hook 22 will tend to pull the float to a normal vertical position and the locking assembly 16 will lock the line in a fixed position. The sinker and hook will remain at the depth they were in when the fisherman stopped reeling in the line.

THE FLOAT

Figure 2:
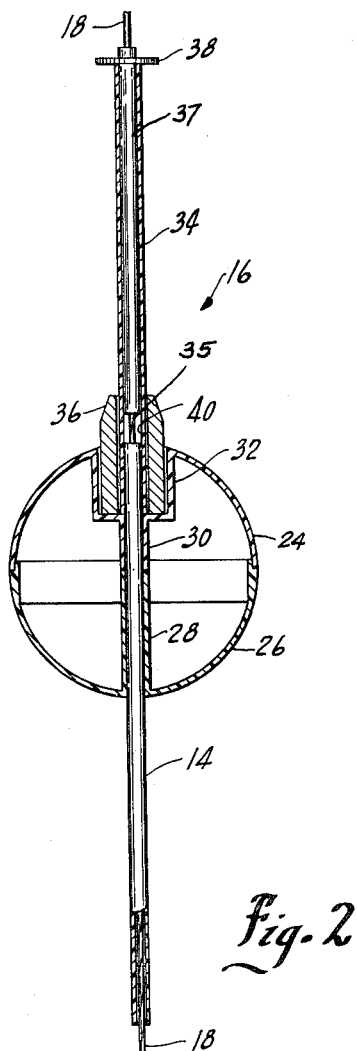
FIG. 2 is a cross sectional view of the fishing float with the locking assembly weight shown in the casting position.

The float 12 can be formed of any buoyant material and as seen in FIG. 1 and 2 is molded in two sections 24 and 26. The lower section 26 is provided with a tubular passage 28. The upper section 24 is provided with a tubular passage 30 and an enlarged opening 32 connected to the passage 30. The float 12 is formed by merely assembling the upper and lower sections 24 and 26 in a conventional manner. The sections 24 and 26 are interengaged along their line of engagement and sealed. The passages 28 and 30 are also sealed at their line of engagement.

Means is provided for guiding the fishing line 18 through the passage 28 and 30 in the form of line guide 14. The line guide 14 can be formed as an integral extension from the passage 28 or as a rigid tube as shown in FIG. 2 positioned in passages 28 and 30. In this regard it should be noted that the tube 14 is secured in the passages 28 and 30 and extends upward into the opening 32.

THE WEIGHTED LOCKING ASSEMBLY

The weighted locking assembly 16 includes a flexible tube 34 and a weight 36. The tube 34 is secured to the portion of the rigid tube 14 which extends upward into the opening 32. The weight 36 is provided with a central passage 40 having an opening slightly larger than tube 34 and has an outer diameter smaller than the opening 32. The weight 36 is normally seated in the opening 32 when the float is cast. The weight 36 slides outward to the line locking position on the tube 34 when the float flips over in the water as described below. Means in the form of a stop plate 38 is provided at the outer end of the flexible tube 34 to prevent or stop the weight 36 from sliding off the end of the tube 34. When the float returns to the normal position, the weight 36 will hold the outer end of the tube 34 down, crimping the line 18 at the point 35 where the tube 34 bends.

The flexible tube 34 can be stabilized by providing a second rigid tube 37 inside of the first tube 34. The second tube 37 should be spaced from the tube 14 to allow the tube 34 to bend at 35. It should also be noted that the bending point 35 is located in the opening 40 of the weight 36 when the weight is seated in opening 32. The weight 36 thereby prevents the tube 34 from bending while the line 18 is being pulled through the line guide 14.

OPERATION

Figure 3:
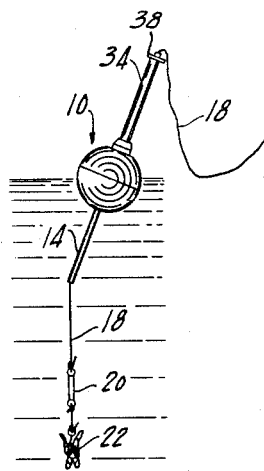
FIG. 3 is a view of the fishing float shown in the water immediately after casting.

The sequence of steps required to set hook 22 and the bait at the desired depth is shown in FIGS. 3 through 6. In FIG. 3 the float 10 is shown immediately after it has landed in the water with the sinker 20 and hook 22 descending toward the bottom of the lake. The line 18 will pass through the locking assembly 16 and line guide 14 until the sinker 20 and hook 22 rest on the bottom of the lake. The float 10 will remain in a generally vertical position until the sinker 20 rests on the bottom of the lake.

Figure 4:
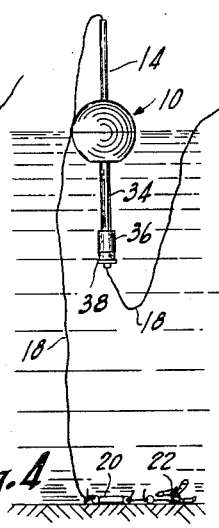
FIG. 4 is a view of the float in the inverted position with the sinker and bait on the bottom of the lake.

In FIG. 4 the sinker 20 and hook 22 are shown resting on the bottom of the lake with the float 10 flipped over due to the weight 36. The weight 36 slides down the tube 34 and is shown in the locking position against the stop 38. The line guide 14 will project upward from the float 10 out of the water. The fisherman on seeing the line guide 14 in the upper position, knows that the sinker 20 and hook 22 are resting on the bottom of the lake. When the weight 36 slides down the tube 34 to the locking psoition, the tube 34 will be free to bend at 35.

Figures 5, 6:
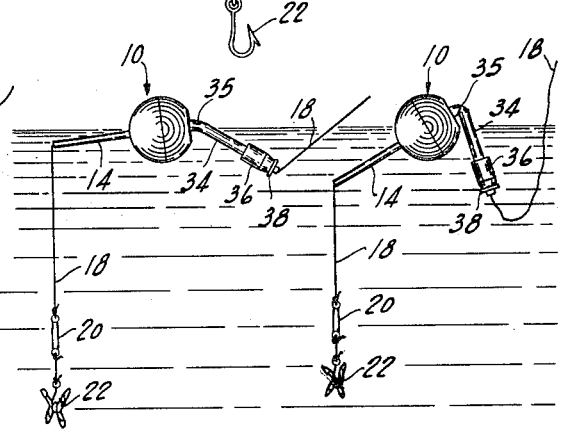

In FIG. 5 the float 10 is shown in the position it will assume when the fisherman starts to reel the line back into the fishing rod to raise the sinker 20 and hook 22 off the bottom of the lake. The weight of the sinker 20 and bait will counter the weight of the weight 36 and the float will assume a generally horizontal position. The weight 36 will remain in the locking position against the stop 38 pulling the end of the tube 34 downward and bending the tube 34 at 35. The tension in the line 18 will pull the weight 36 up reducing the amount or degree of the bend 35 on the flexible tube 34. The line 18 will be free to be reeled through the float 10.

When the fisherman stops reeling the line 18 in, the tension on the line 18 will be relaxed and the weight 36 will pull the tube 34 downward increasing the bend in the tube 34 sufficiently to crimp the line 18 so that the line 14 cannot move in the float 10.

When the line 18 is reeled in, the weight 36 will be pulled upward pulling the flexible tube 34 upward to release the line 18. The resistance of the water to the movement of the float in the water will hold the float 10 in a generally stationary position until the sinker 20 and hook 22 reach the end of the line guide 14. The sinker 20 and hook 22 will be pulled substantially vertically upward from the lake bed when the line is reeled in, minimizing the possibility of becoming entangled in any weeds on the lake bed.

I claim:

1. A fishing float comprising a buoyant body, a passage through said body, a flexible tube positioned in said passage and extending outward from one end of said passage, and a weight slidably mounted on said flexible tube for bending said flexible tube on movement from a casting position adjacent to said body to a position on the outer end of said tube and spaced from said body whereby said line will be locked in the tube. a flexible tube secured to said portion of said rigid tube and extending outward from said opening, a stabilizing tube in said flexible tube, the inner end of said stabilizing tube being spaced from said rigid tube, and a weight mounted for sliding movement on said flexible tube and being movable from a casting position in said opening to a position at the outer end of said flexible tube whereby said tube will bend at the space between the stabilizing tube and the rigid tube to lock the line in the tube.

2. The float according to claim 1 including a rigid tube extending outward from the other end of said passage.

3. The float according to claim 1 including a rigid stabilizing tube in said flexible tube.

4. The float according to claim 3 including a rigid guide tube extending outward from the other side of said passage.

5. A fishing float comprising
a buoyant body,
a hollow flexible tube extending outward from one side of said body,
a hollow rigid tube extending outward from the other side of said body,
a fishing line passing through said flexible tube and said rigid tube,
and means on said flexible tube for bending said flexible tube to lock the fishing line in said tube.

6. The float according to claim 5 wherein said bending means comprises a weight mounted for sliding movement on said flexible tube.

7. The float according to claim 6 including a sinker on said fishing line, said weight and sinker counterbalancing the float until the sinker hits the bottom of the lake.

8. The float according to claim 5 including means for stabilizing said hollow flexible tube.

9. The float according to claim 8 wherein said stabilizing means comprises a rigid tube positioned within said flexible tube.

10. A fishing line float comprising
a buoyant body having a passage and an enlarged opening at one end,
a first rigid tube positioned in said passage and extending outward from said float, a portion of said rigid tube extending into said opening, 11. The float according to claim 10 wherein said weight has sufficient length to bridge the space between the rigid tube and the stabilizing tube when positioned in the casting position.

* * * * *